US011209375B2

(12) United States Patent
Findlay et al.

(10) Patent No.: US 11,209,375 B2
(45) Date of Patent: Dec. 28, 2021

(54) ANNEALING PARAMETER DETERMINATION

(71) Applicant: AMP Annealing Limited, Pukekohe (NZ)

(72) Inventors: Alexander Findlay, Auckland (NZ); Matthew Alexander Findlay, Auckland (NZ); Geoffrey Michael Causley, Auckland (NZ)

(73) Assignee: AMP ANNEALING LIMITED, Auckland (NZ)

(*) Notice: Subject to any disclaimer, the term of this patent is extended or adjusted under 35 U.S.C. 154(b) by 166 days.

(21) Appl. No.: 16/252,634

(22) Filed: Jan. 19, 2019

(65) Prior Publication Data
US 2019/0227013 A1 Jul. 25, 2019

Related U.S. Application Data

(60) Provisional application No. 62/619,302, filed on Jan. 19, 2018.

(51) Int. Cl.
H05B 6/36 (2006.01)
C21D 1/42 (2006.01)
G01N 25/04 (2006.01)
C22F 1/00 (2006.01)
H05B 6/10 (2006.01)
H05B 6/06 (2006.01)
H05B 6/40 (2006.01)

(52) U.S. Cl.
CPC ............... *G01N 25/04* (2013.01); *C21D 1/42* (2013.01); *C22F 1/00* (2013.01); *H05B 6/06* (2013.01); *H05B 6/101* (2013.01); *H05B 6/36* (2013.01); *H05B 6/367* (2013.01); *H05B 6/40* (2013.01)

(58) Field of Classification Search
CPC .. G01N 25/04; C21D 1/42; C22F 1/00; H05B 6/06; H05B 6/101; H05B 6/36; H05B 6/367
See application file for complete search history.

(56) References Cited

U.S. PATENT DOCUMENTS

| 7,015,439 | B1* | 3/2006 | Thomas | H05B 6/06 219/663 |
| 8,038,931 | B1* | 10/2011 | Thomas | H05B 6/101 266/96 |
| 2014/0144903 | A1* | 5/2014 | Findlay | F42B 33/00 219/643 |
| 2019/0227013 | A1* | 7/2019 | Findlay | H05B 6/36 |

* cited by examiner

Primary Examiner — Scott R Kastler
(74) Attorney, Agent, or Firm — Rock IP, PLLC

(57) ABSTRACT

This disclosure relates to determining a material transition point such as a melt-point, and to determining an annealing parameter based on the determined material transition point. Changes in a parameter associated with an electromagnetic circuit coupled to an object subject to heating are monitored. A material transition point is determined upon detecting a predetermined change in the parameter. The annealing parameter is derived from the determined material transition point.

10 Claims, 8 Drawing Sheets

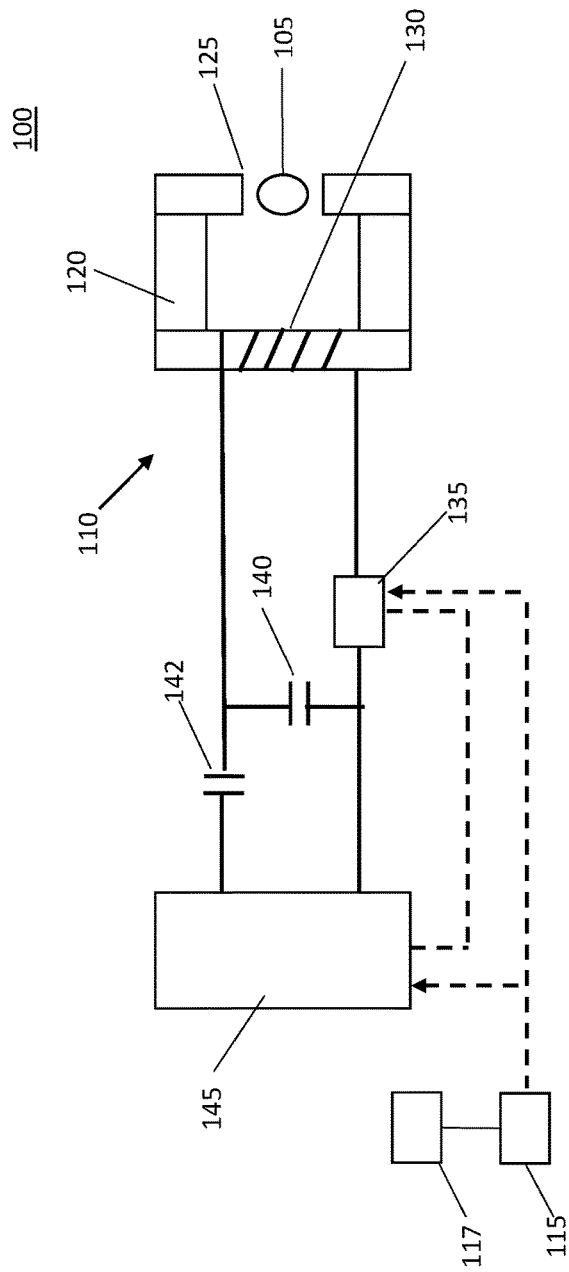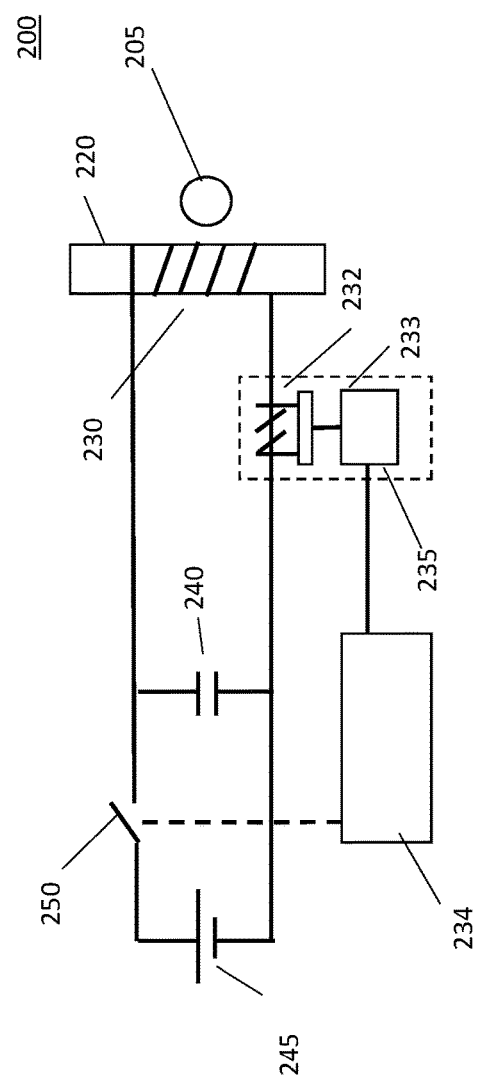

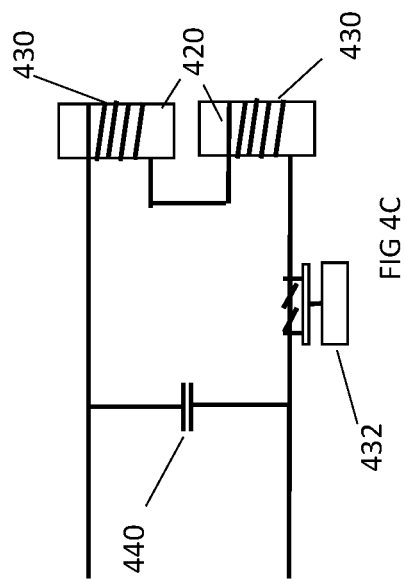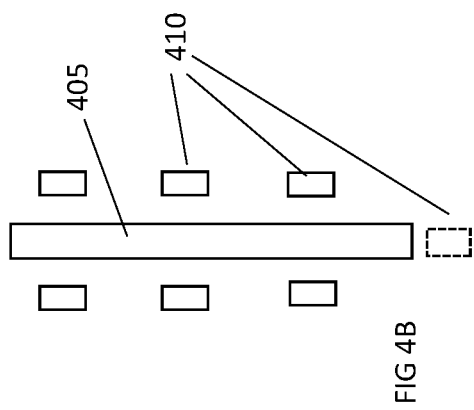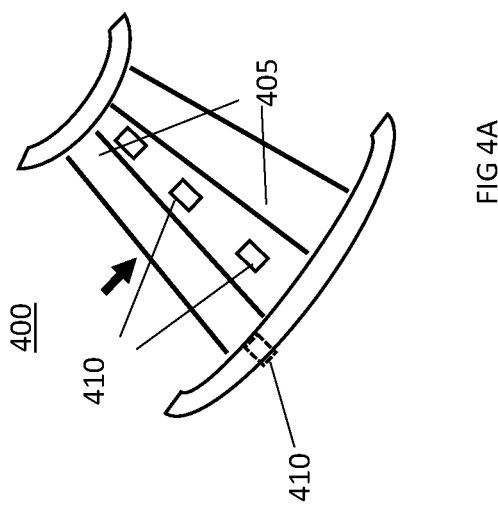

ANNEALING PARAMETER DETERMINATION

TECHNICAL FIELD

This disclosure relates to determining a material transition point such as a melt-point, and to determining an annealing parameter based on the determined material transition point.

BACKGROUND

Melting point determination methods typically require heating and manual observation or testing of a material sample, however this is cumbersome and expensive, prone to human error and difficult to automate.

Firing and reloading of brass cartridges causes the alloy to become brittle around the neck. In order to reuse brass cartridges, it is beneficial to first anneal the neck. Annealing is the process of heating a metal to near its recrystallisation or melting point and allowing it to cool to allow the crystals to reform in a more optimal manner for reuse. Inductive heating can be used to transfer sufficient energy to the brass neck to cause the required heating. However, this process is subject to a number of variables that can impact on the annealing process. These variables include the dimensions and material composition of the cartridge, the magnetic coupling between the inductive heating apparatus and the neck, and the mass of brass to be annealed. There are a large number of different types of brass cartridge, and the inductive heating apparatus must be calibrated for each which is labour intensive.

It is an object to provide an improved method and/or apparatus for determining a material transition point, and/or determining an annealing parameter, or at least provide the public with a useful choice.

SUMMARY

In one aspect there is provided a method of determining a material transition point of an object subject to temperature change, the method comprising: monitoring changes in a parameter indicative of a characteristic of a magnetic circuit coupled to the object; determining the material transition point upon detecting a predetermined change in the parameter. This may be implemented using computer software and a processor, and/or analogue electronic circuitry.

The magnetic circuit may comprise a coil coupled to a magnetically permeable core to which the object is proximally located, typically within an airgap in the core, and wherein the parameter is related to the inductance of the coil.

The parameter may be related to a resonant frequency of an electromagnetic circuit comprising the coil and a capacitor. Monitoring the parameter may comprise monitoring the duration of a predetermined number of electrical cycles following electrical energisation of the electromagnetic circuit, although other methods of monitoring for changes in the resonant frequency may be used.

The electrical energisation of the electromagnetic circuit may comprise application of a voltage or current impulse, for example switching a rail voltage, or brief application of an inverter at close to the resonant frequency.

Another method of monitoring a parameter related to the inductance of the coil may alternatively be used, for example the rate of change of current in the coil in response to an applied voltage.

The predetermined change in the parameter may be a threshold increase or decrease of the parameter following electrical energisation of the circuit. For example, a decrease in the duration of a predetermined number of cycles of the resonant frequency current in the electromagnetic circuit compared with one or more previous measurements of the same parameter.

The changes in the monitored parameter may also or alternatively be used to determine another type of change in the magnetic circuit, for example the coupling or decoupling of the object into the circuit, or it's movement within the airgap.

These methods may be used for determining a melt-point of cartridge cases or other metallic parts for annealing. The methods may also be used for determining potential failure modes in metallic parts, for example by detecting a melt-point in blades of a gas turbine. An array of sensors may be implemented to operate according to one or more of the above methods and be used to determine which part of a blade is close to melting point. The methods may also be used for monitoring of critical components in rocket launching in order to abort take-off or take other action in response to detecting a melt-point event. Thus, a melt-point may be detected before complete failure of a component or its explosion.

There is also provided an apparatus for determining a material transition point of an object subject to temperature change, the apparatus configured to monitor changes in a parameter indicative of changes in a magnetic circuit coupled to the object; and to determine the material transition point upon detecting a predetermined change in the parameter.

In an embodiment the apparatus may comprise a coil coupled to a magnetically permeable core for coupling to the object, and where the apparatus monitors a parameter related to the inductance of the coil. Example parameters include the resonant frequency of an electromagnetic circuit comprising the coil and a capacitor or a parameter related to the resonant frequency such as the time to count a predetermined number of cycles of a current waveform in the resonant circuit following a voltage impulse. Alternative parameters may include a rate of change of current through the coil in response to an applied voltage. The apparatus may comprise an inverter or a DC voltage source and switch for applying an impulse to the circuit.

In another aspect there is provided a method of determining an annealing parameter for an object, the method comprising: heating the object and monitoring changes in a parameter indicative of a characteristic of a magnetic circuit coupled to the object; determining the material transition point upon detecting a predetermined change in the parameter; deriving the annealing parameter from the material transition point. This may be implemented using computer software and a processor, and/or analogue electronic circuitry.

The magnetic circuit may comprise a coil coupled to a magnetically permeable core to which the object is proximally located, and wherein the parameter is related to the inductance of the coil. The core may include an airgap between core parts and into which the object is located.

Heating the object may be implemented using an inductive heating apparatus. The inductive heating apparatus may be modified to implement the above method.

The parameter may be related to a resonant frequency of an electromagnetic circuit comprising the coil and a capacitor. Monitoring the parameter may comprise monitoring the duration of a predetermined number of electrical cycles following electrical energisation of the electromagnetic circuit, although other methods of monitoring for changes in the resonant frequency may be used. The electrical energisation of the electromagnetic circuit may comprise application of a voltage or current impulse, for example switching a rail voltage, or brief application of an inverter at close to the resonant frequency.

Other methods of monitoring a parameter related to the inductance of the coil may alternatively be used, for example the rate of change of current in the coil in response to an applied voltage. The inductance itself may be measured for example by the application of an AC signal through a sensor resistor and the coil whilst monitoring the voltage across the resistor. Knowing the applied voltage, frequency and the voltage across the resistor gives the voltage across the coil so that the inductance can be calculated.

The predetermined change in the parameter may be a threshold increase or decrease of the parameter following electrical energisation of the circuit. For example, an increase of 30 units of the parameter compared with previous measurements, although of course other thresholds could be used.

The annealing parameter may be derived from the material transition point using a lookup table or mathematical equation derived experimentally.

The annealing parameter may be derived from heating required to achieve a predetermined hardness of the object, for example an anneal-time at a predetermined energy transfer rate.

The annealing parameter may correspond to a fraction of a melt-time required to melt a sacrificial object. This fraction or anneal-time may be sufficient to achieve a hardness score within upper and lower bounds of a predetermined hardness score for an average object—this may correspond to an ideal hardness score for annealing for an average object.

The annealing parameter may be an energy transfer rate and duration such as the power rating and ON time of an inductive heating apparatus. More generally, the material transition point is related to an amount of energy transfer for melting. The amount of energy transfer for melting may correspond to a melt time at a given rate of energy transfer. The annealing parameter may be an amount of energy for annealing. The amount of energy transfer for annealing corresponds to an anneal time at a given rate of energy transfer.

In an embodiment the material transition point is determined using a sacrificial object in order to determine the annealing parameter for use on other similar objects. Because the parameters of different cartridge make and models vary, for example the neck dimensions and material composition and mass, the annealing parameters may also vary and so a sacrificial cartridge can be used to determine an appropriate annealing parameter for each cartridge make and model. Thus, a sacrificial cartridge is used to determine a melt-point such as an inductive heating energy transfer rate and duration for a particular make (ie manufacturer) and model (ie product) brass cartridge. The sacrificial cartridge can no longer be used, but an energy transfer rate and duration to be used for annealing of other cartridges of the same make and model can then be determined from this melt-point. Similarly, annealing parameters can be determined for other types of cartridges, and indeed for other metallic objects to be reconditioned, again by determining a melt-point for a sacrificial object having similar properties.

There is also provided an apparatus for determining an annealing parameter for an object, the apparatus configured to heat the object and monitor changes in a parameter indicative of changes in a magnetic circuit coupled to the object; determine the material transition point upon detecting a predetermined change in the parameter; derive the annealing parameter from the material transition point.

In an embodiment the apparatus may comprise a coil coupled to a magnetically permeable core for coupling to the object, and wherein the apparatus monitors a parameter related to the inductance of the coil. Example parameters include the resonant frequency of an electromagnetic circuit comprising the coil and a capacitor or a parameter related to the resonant frequency such as the time to count a predetermined number of cycles of the resonant circuit following a voltage impulse. Alternative parameters may include a rate of change of current through the coil in response to an applied voltage, the time to charge or discharge the capacitor through the coil in response to an applied voltage. The apparatus may comprise an inverter or a DC voltage source and switch for applying an impulse to the circuit.

In another aspect there is provided a method of determining an annealing parameter for an object, the method comprising: determining a material transition point; deriving the annealing parameter from the material transition point.

In an embodiment the material transition point may be determined from an external source, such as downloading a melt-point from an Internet based database, for example in response to the provision of other data about the object such as manufacturer and product information.

In another aspect there is provided a method of determining an annealing parameter for an object, the method comprising: heating the object in order to determine a material transition point; deriving the annealing parameter from the material transition point.

In an embodiment the material transition point may be determined by manual observation or testing apparatus, then provided to an annealing apparatus or an online conversion application in order to generate a corresponding annealing parameter.

In another aspect there is provided an apparatus for determining an annealing parameter for an object, the apparatus comprising: an electromagnetic circuit arranged to couple to the object;

electronic circuitry arranged to monitor changes in a parameter associated with the magnetic circuit in response to heating of the object and to determine a material transition point upon detecting a predetermined change in the parameter, the material transition point corresponding to an annealing parameter.

In another aspect there is provided a method of determining an annealing parameter for an object, the method comprising: monitoring changes in a parameter associated with an electromagnetic circuit coupled to an object subject to heating; determining a material transition point upon detecting a predetermined change in the parameter; deriving the annealing parameter from the material transition point.

In another aspect there is provided a method of detecting a potential failure mode of an object, the method comprising: monitoring changes in a parameter associated with an electromagnetic circuit coupled to an object subject to heating; determining a material transition point upon detecting a predetermined change in the parameter; signalling a potential failure mode of the object in response to determining the material transition point.

In an embodiment the object is subjected to heating by a heating source and the heating source is controlled to reduce the heating in response to the signalling of a potential failure mode. The object may be a turbine blade such as used in a jet engine, and the heating source may be combustion in the engine. Detection of a material transition point in part of the turbine blade may allow the heating to be reduced in order to prevent its failure.

In another aspect there is provided a method of determining a material transition point of an object, the method comprising: monitoring changes in a parameter associated with an electromagnetic circuit coupled to the object; determining a material transition point upon detecting a predetermined change in the parameter; wherein the parameter is related to inductance of a coil forming part of the electromagnetic circuit.

In an embodiment the parameter is related to a resonant frequency of the electromagnetic circuit comprising the coil and a capacitor. The parameter may be the duration of a predetermined number of electrical cycles following electrical energisation of the electromagnetic circuit.

In another aspect there is provided a method of determining a material transition point of an object, the method comprising: monitoring changes in a parameter associated with an electromagnetic circuit coupled to the object; determining a material transition point upon detecting a predetermined change in the parameter; wherein the parameter is related to a resonant frequency of the electromagnetic circuit comprising a coil and a capacitor.

In an embodiment, the parameter may be the duration of a predetermined number of electrical cycles following electrical energisation of the electromagnetic circuit.

In another aspect there is provided a method of determining a material transition point of an object, the method comprising: monitoring changes in a parameter associated with an electromagnetic circuit coupled to the object; determining a material transition point upon detecting a predetermined change in the parameter; wherein the electromagnetic circuit comprises a coil coupled to a magnetically permeable core having an airgap into which the object is located in use.

In another aspect there is provided a method of determining an annealing parameter of an object of a predetermined type, the method comprising: determining an energy transfer for reaching a melt point at part of another object of the same type; determining an energy transfer for reaching an annealing point for another object of the same type; determining the anneal parameter by calculating a ratio of the energy transfer for the melt point and anneal point.

In an embodiment, the energy transfer for reaching a melt point may be a melt time at a predetermined heating rate and the energy transfer for reaching an anneal point may be an anneal time at the predetermined heating rate.

Further aspects of the disclosure, which should be considered in all its novel aspects, will become apparent to those skilled in the art upon reading the following description which provides one or more examples of a practical application.

BRIEF DESCRIPTION OF THE DRAWINGS

One or more embodiments will be described below by way of example only, and without intending to be limiting, with reference to the following drawings, in which:

FIG. 1 is a schematic of a material transition point determining apparatus;

FIG. 2 is a schematic of a material transition point determining apparatus according to another embodiment;

FIG. 4A-C illustrate applications of an object material transition point determining apparatus in a gas turbine;

DESCRIPTION OF EMBODIMENTS

Figure 3:
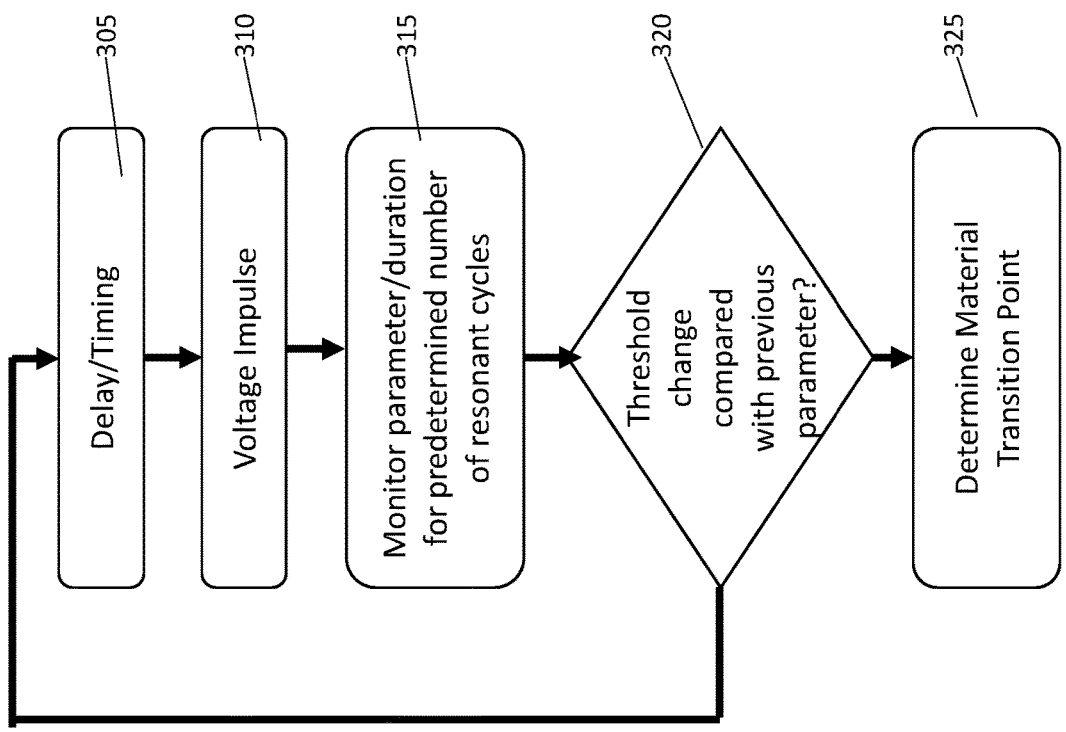
FIG. 3 is a flow chart of a method of determining a material transition point of an object.

FIG. 1 shows a material transition point apparatus 100 for determining a material transition point for an object 105. The object may be one of a number of metal workpieces such as brass cartridges to be annealed, or it may be a component part of a larger system which may be exposed to heat that could be excessive and cause the object to go through an unwanted material transition. The material transition point may correspond to a temperature at which the material of the object begins to melt, or some other temperature such as a re-crystallisation temperature for example.

The material transition point apparatus 100 comprises an electromagnetic circuit 110 having a magnetically permeable core 120 such as ferrite, and a coil 130 wound about the core 120. The coil 130 is also connected to an electrical components which may include a capacitor 140 in order to form a resonant circuit, and a driver 145 such as an inverter to drive the electromagnetic circuit. Electronic circuitry 135 is coupled to the electromagnetic circuit and may include a sensor for measuring a parameter indicative of or related to the inductance of the coil 130 or the resonant frequency of the electromagnetic circuit. A coupling capacitor 142 may also be employed. The electronic circuitry may be supplemented by a processor 115 and memory 117 for controlling the electronic circuitry and/or calculating an anneal parameter based on operation of the apparatus 100.

In use an object 105 is coupled into the electromagnetic circuit 110 across an airgap 125. It has been discovered that temperature changes of the object affect one or more characteristics of the magnetic circuit 110 that in turn affect measurable properties of the electromagnetic circuit 110 to which it is coupled. It has also been discovered that a predetermined type of change in these measurable properties corresponds to a material transition point of the object 105 such as its melting point.

The embodiment monitors changes in a parameter related to the resonant frequency of the electromagnetic circuit in order to determine a material transition point of the object 105. However other parameters may alternatively be used such as change in the resonant frequency itself, the inductance of the coil 130, changes in current in the electromagnetic circuit 110. It is noted that some measurement approaches may not require the capacitor 140.

FIG. 3 illustrates a method 300 of operating the apparatus 100 and includes periodically starting a monitoring algorithm—for example every 0.1 seconds (step 305). The method then applies a voltage impulse in order to measure the response of the electromagnetic circuit 115 (step 310). The voltage impulse or electrical energisation is applied to the electromagnetic circuit by the driver 145 which may be an inverter briefly switching to its rail voltage, or a simple switch to a DC voltage. As is known the voltage impulse will cause the electromagnetic circuit 115 to resonate at a frequency dependent on the capacitance value of the capacitor 140 and the inductance value of the coil 130. The inductance value is affected by changes in magnetic reluctance in the core and object, including temperature changes in the object 105. As noted above material transition changes in the object, for example melting due to applied heat, can be detected by monitoring changes in the resonant frequency or a parameter dependent on this.

The method uses a parameter related to the resonant frequency which is simple and inexpensive electronic circuitry 135 to implement, and may make use of existing hardware in annealing apparatus or other devices. However other parameters could alternatively be used such as the inductance of the coil or its effect such as the rate of change of current following an applied voltage. Following the voltage impulse, the method counts cycles of the resonant frequency waveform and monitors the duration required for a predetermined number of cycles (step 315). The longer the duration required for the predetermined number of cycles, the lower the frequency and vice versa.

The parameter monitoring is implemented using the electronic circuitry 135 which may comprise a current transformer coupled to the electromagnetic circuit and simple analogue and/or digital counting circuitry in order to determine that the predetermined number of cycles have been achieved. A microprocessor or microcontroller may be used to control the voltage impulse or electrical energisation of the electromagnetic circuit, reset the counting circuitry, and determine the duration for the predetermined number of cycles—the parameter indicative of changes in the magnetic circuit in this embodiment. The processor or controller may store one or more parameter values for comparison with future parameter measurements.

The method then compares the recently determined parameter with the previously determined parameter to determine whether a threshold change has occurred (step 320). The threshold change may be an increase or decrease by a predetermined value, percentage or other measure. Alternatively, the method may integrate a number of previous parameter measurements and compare this average value to the newly measured value and make the threshold determination on this basis—such as an approach may reduce the impact of noise on the measurements.

Figure 7A:
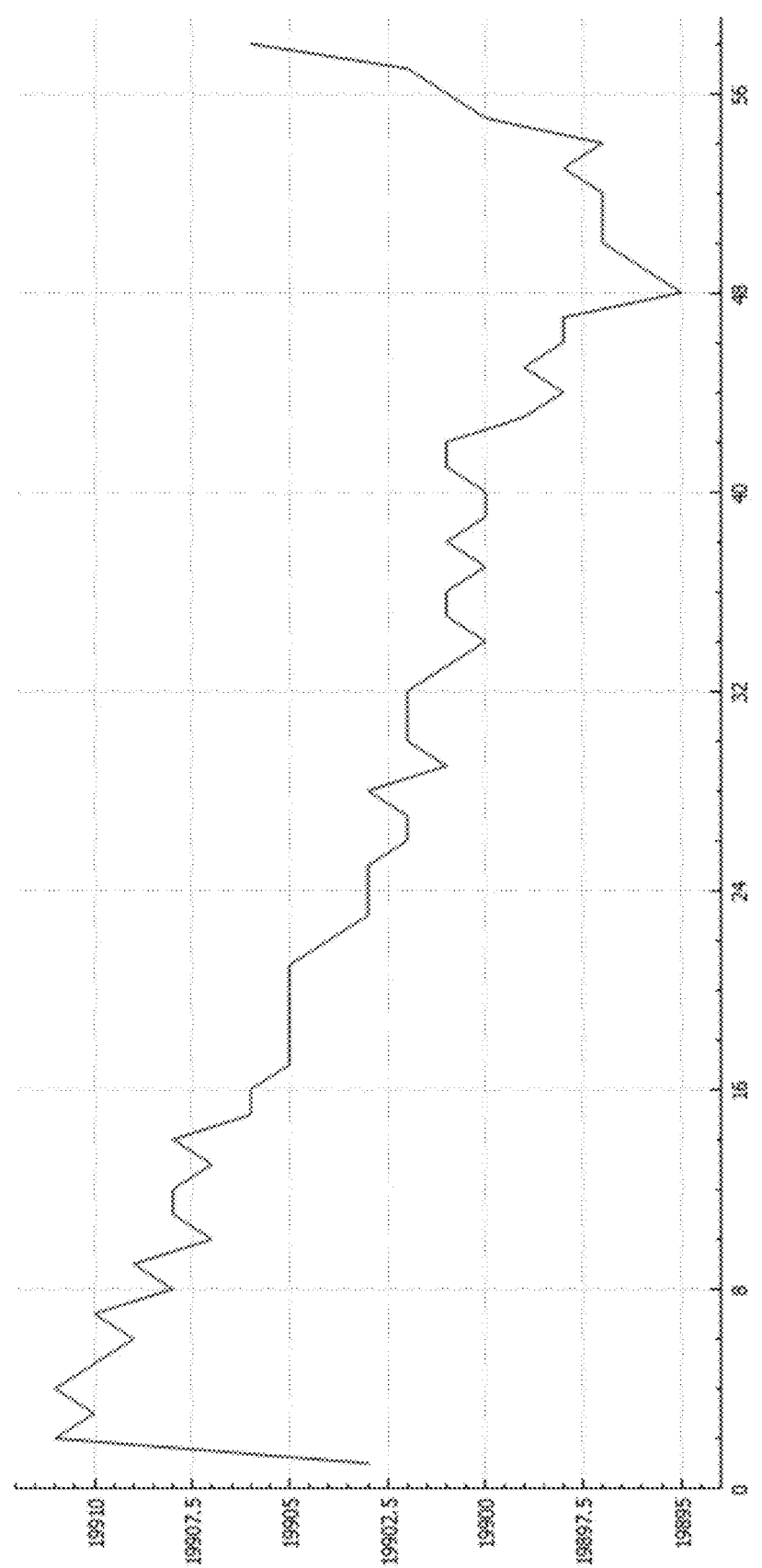
FIG. 7A-C are graphs showing a parameter indicative of changes in a magnetic circuit coupled to the object.
Figure 7B:
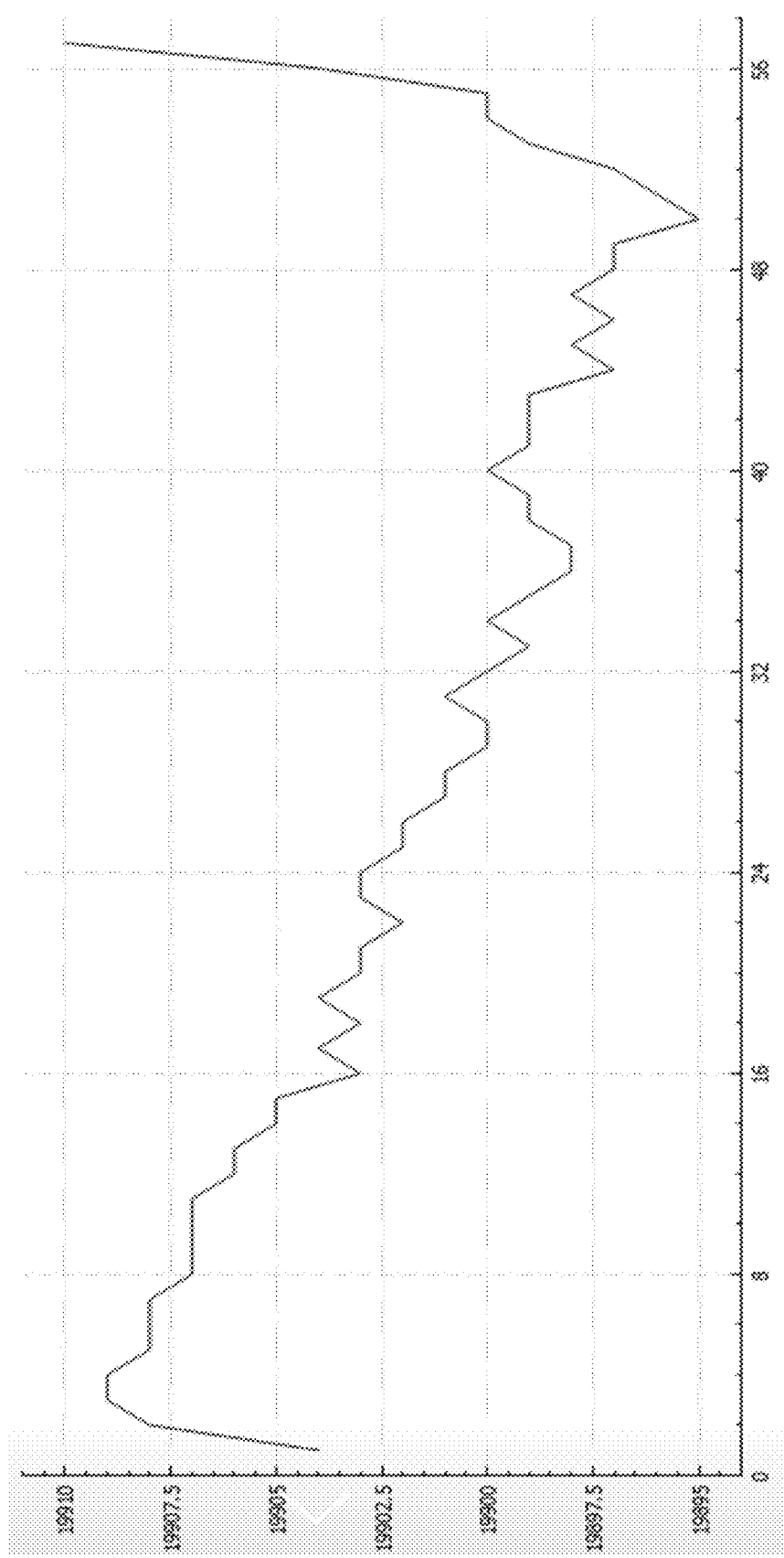
Figure 7C:
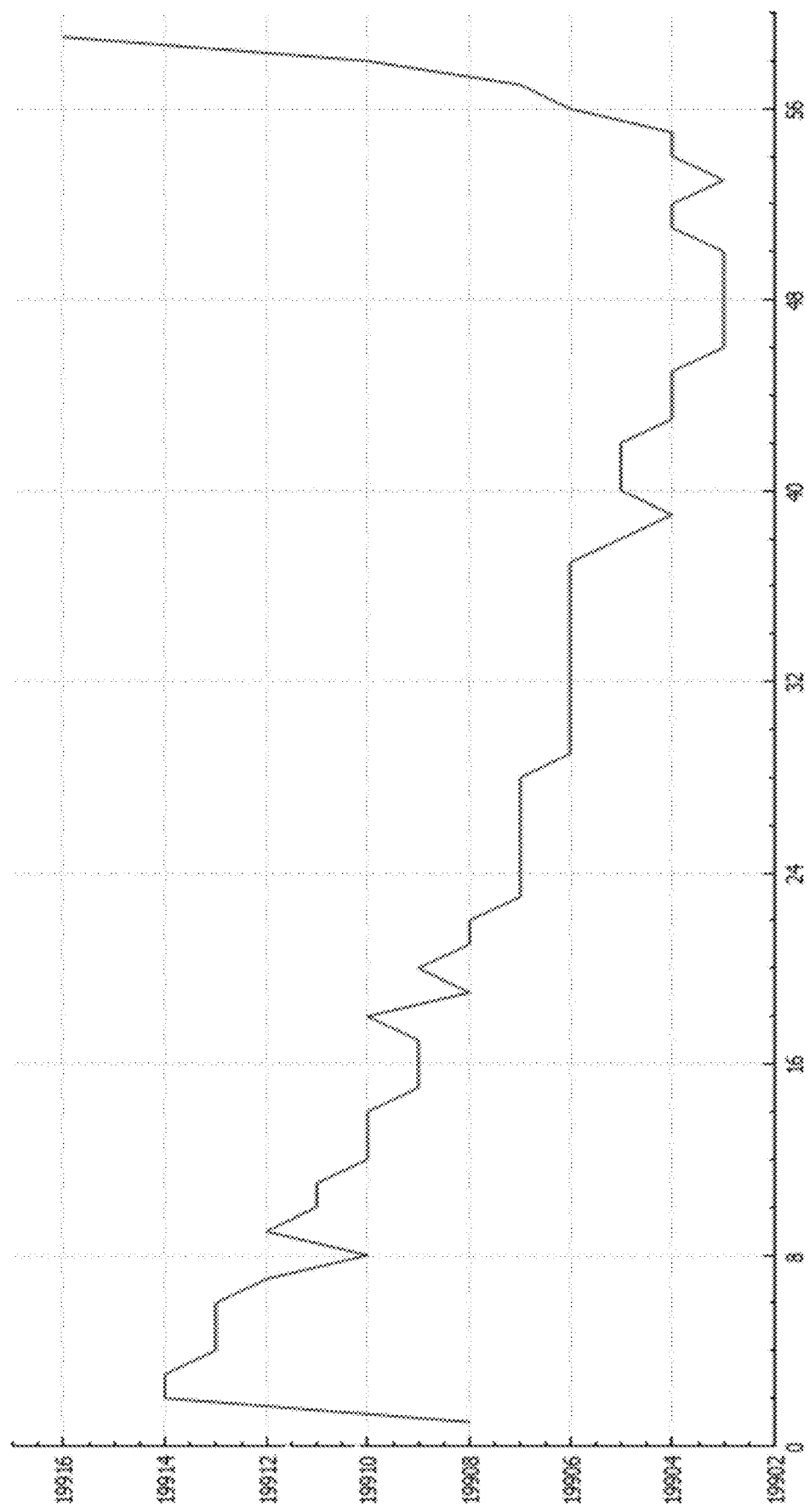

FIG. 7A-C are graphs showing the monitored parameter over a period during which three different types of object are heated. As can be seen the parameter related to the resonant frequency (vertical axis) varies as the objects are heated (time is on the horizontal axis). Once heated to a material transition point towards the right-hand side of the graphs, it can be seen that the monitored parameter undergoes a more characteristic or noticeable change that is detectable. This change exceeds a threshold, for example an increase in a predetermined number of units compared with the previous parameter measurement.

If the threshold is not exceeded, then the method returns to the first step (305) to repeat the algorithm at the next time interval. If however the threshold is exceeded, the method determines that the object has reached a material transition point (step 325). This may correspond to the object beginning to melt. Once a material transition point has been determined, an action may be taken depending on the application.

FIG. 2 illustrates an alternative apparatus 200 for determining a material transition point for a metallic object 205. The apparatus comprises a simplified magnetically permeable core 220 having a straight bar form to which the object 205 may be proximally located. A coil 230 wound around the core 220 is coupled with a parallel connected capacitor 240 to form a resonant circuit. Electronic circuitry 235 comprising a current transformer 232 and cycle counting circuitry 233 may be connected to a microprocessor 215 or timer. The resonant circuit is coupled to a DC source such as a battery by a switch 250 controlled by the microprocessor. This arrangement is sufficient to provide the voltage impulse to trigger a decaying resonant waveform in the resonant circuit, and which is measurable by the sensor circuitry 232, 233, 234.

This low-cost approach could be used to provide melt-point detectors on a large scale for monitoring components in complex systems such as aircraft engines or rocket launching equipment where the components are subject to large and potentially catastrophic heating gradients.

FIG. 4A is a partial view of rotating components such as blades 405 in a gas turbine 400 that may be used in an aircraft engine for example. Material transition point determining apparatus 410 according to one of the above or alternative embodiments may be employed to detect a material transition point at different locations of each blade 405 as it rotates. Detecting such a point may be configured to cause the engine to reduce power or take some other corrective action, which could include scheduling a service. Alternatively depending on the arrangement of the system, a single material transition point apparatus 410 may be located in an outer casing at the distal end of the blades which then sweep over it—this is shown in dashed outline. FIG. 4B shows a section view of FIG. 4A with a blade 405 passing between the apparatus 410—or alternatively over the apparatus 410 shown dashed. The circuit arrangement of FIG. 2 may be used for these material transition point apparatus 410. FIG. 4C illustrates an alternative magnetic and electrical implementation for these apparatuses 410. These may include two cores 420 each with coils 430 located either side of the blades and connected to a common capacitor 440 to form the resonant circuit. This may improve sensitivity whilst reducing noise.

Figure 5B:
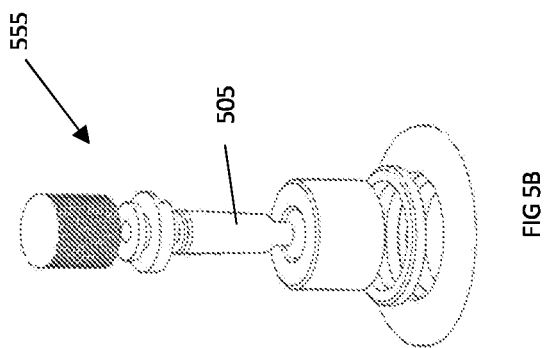
FIG. 5A-C illustrate an apparatus for determining an annealing parameter for brass cartridges.
Figure 5C:
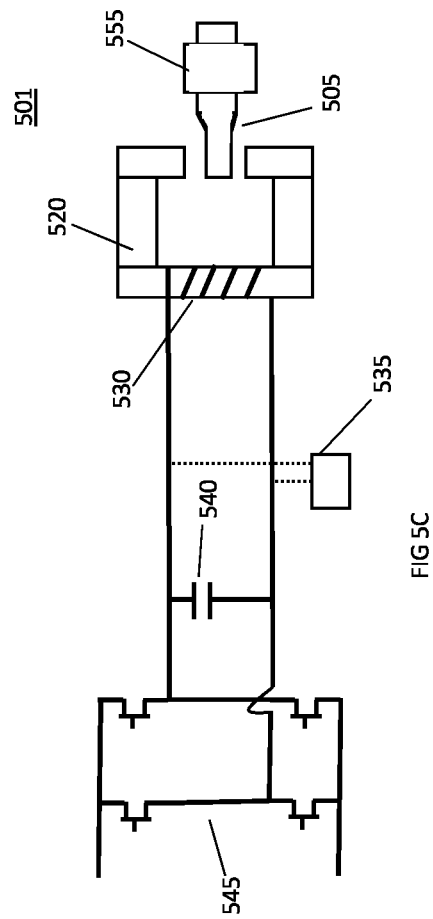
Figure 5A:
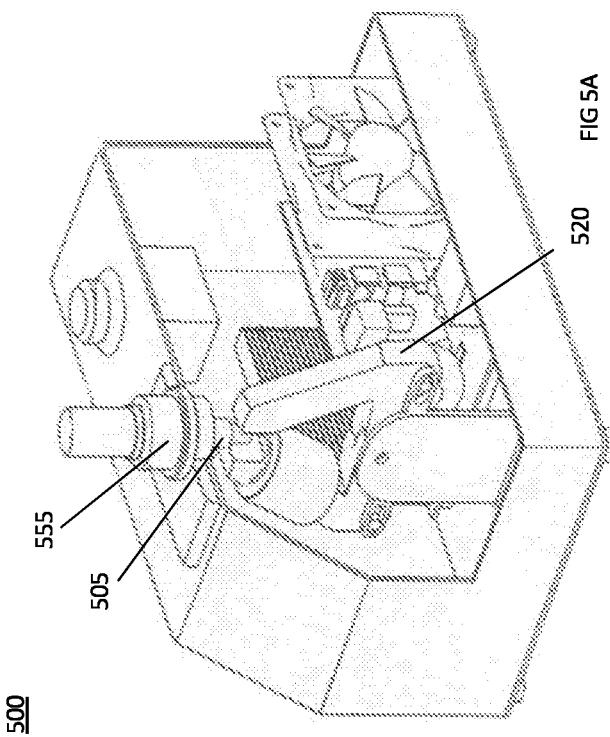

FIG. 5A shows an apparatus 500 for annealing brass cartridges 505 using induction heating and includes a magnetically permeable core 520 and a holder 555 for securing the cartridge 505 such that its neck is correctly positioned in an airgap formed by the core. An exploded view of the cartridge holder 555 can be seen in FIG. 5B. More details of such an apparatus 500 are provided in the applicant's U.S. Pat. No. 9,631,251, the contents of which are hereby incorporated.

A modified version of this or a similar apparatus 501 may be used to determine a material transition point of the brass cartridge 505 according to an embodiment. The determined material transition point may also be used to determine an annealing parameter appropriate for cartridges of a similar type, for example similar dimensions, material composition, mass of material and other factors. These modifications to the annealing apparatus 500 may be simply implemented by software upgrade.

FIG. 5C shows an electrical schematic of an apparatus 501 (whether modified version of annealing apparatus 500 or a new device) for determining a material transition point of a brass cartridge and determining an annealing parameter for similar cartridges. The apparatus 500 comprises a magnetically permeable core 520 having a wound coil 530 connected to a capacitor 540, a sensor 535 and a driver 545, in this example a full bridge inverter. These components are analogous to those previously described in respect of the apparatus 100, 200 for determining a material transition point. A cartridge 505 is secured in a holder 555 such as that of FIG. 5B which securely positions the neck of the cartridge into an airgap in the core 520. The core 520, airgap and cartridge 505 form part of an electromagnetic circuit as previously described with respect to the material transition point determining apparatus.

As noted the external housing and most of the internal components of the apparatus 501 of FIG. 5C may be the same as, or similar to, the apparatus 500 described in U.S. Pat. No. 9,631,251. The modification may simply require a software update to cause operation of the apparatus 500 to change according to an embodiment described below. Alternatively or additionally, various components may be altered, for example the core 520 in apparatus 500 is described in some embodiments as being mechanically adjustable, whereas the core 521 of apparatus 501 may be fixed. Also, whilst the apparatus 500 may include means for monitoring the current in the resonant circuit, an additional sensor 535 may be included to provide additional or more accurate functionality. The sensor 535 may measure the voltage across the resonant circuit and use the waveform for monitoring the resonant frequency.

The apparatus 501 is arranged to monitor for changes in a parameter indicative of changes in the electromagnetic circuit coupled to the cartridge 505 as previously described with respect to apparatus 100 and 200. Similarly, the apparatus 501 is arranged to determine a material transition point upon detecting a predetermined change in the parameter. The apparatus 501 is capable of induction heating and is configured to heat the cartridge 505 at a known energy transfer rate, in order to determine a heating duration required to reach the material transition point. The material transition point may correspond to a melt-point of the cartridge neck so that the energy transfer or heating duration corresponds to a melt-time.

Figure 6:
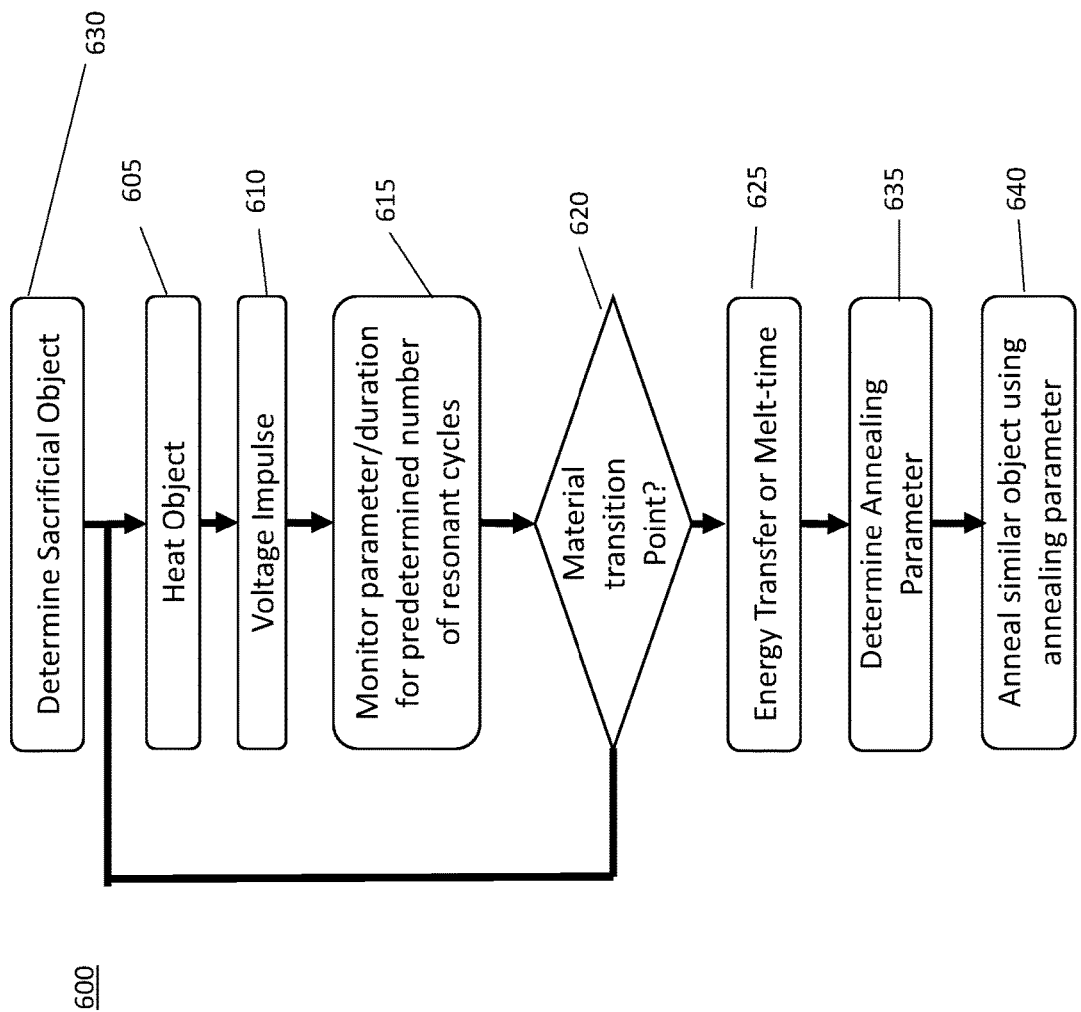
FIG. 6 is a flow chart of a method of determining an annealing parameter for a brass cartridge.

The apparatus 501 is then configured to derive an annealing parameter from the material transition point. The annealing parameter may be a heating time for annealing similar cartridges, and which is a fraction of the previously determined melt-time. A method for determining the annealing parameter is described below with respect to FIG. 6.

The method 600 for determining an annealing parameter for a firearms cartridge of a particular type first requires heating a sacrificial cartridge of that same type (step 605). Heating of the cartridge or object 505 is typically implemented using induction heating at a fixed energy transfer rate for a number of heating durations, for example 0.1 second intervals. The total number of heating durations required until determination of the melt-point provides a melt-time, and in between the heating durations measurements can be made of the parameter indicative of changes in a magnetic circuit. This is typically carried out by switching the induction heating off and applying a voltage impulse (step 610) and then determining the duration required for a predetermined number of cycles of the resultant resonant waveform (step 615). Alternatively, the heating may be continuous with the measurements carried out during heating.

FIG. 7A-C are graphs for three cartridge types showing the parameter which is derived from a duration for 16 cycles of the resonant waveform following the voltage impulse. This parameter is related to the resonant frequency of the electromagnetic circuit 505, 521, 530, 540 and varies as the cartridge is heated. Each measurement is carried out after a further 0.1 seconds of induction heating. The measurement cycle typically takes less than 0.2 milliseconds and so does not significantly impact on the accumulated heating duration being an accurate reflection of an accurate melt-time.

The relatively large change in parameter at the end of each graph corresponds to a material transition point or melt-point of the cartridge neck, expressed in the graph as a melt-time. This change can be detected by determining whether the change in parameter compared with the previous measurement exceeds a threshold (step 620).

The threshold may be a numerical difference in parameter units, for example an increase of 30 units, or a percentage increase (or decrease depending on which parameter is used). Other algorithms may be used, for example the latest or current parameter measurement may be compared with a number of previous parameter measurements in order to reduce the effect of noise or other artefacts of the monitoring process or material transition. A pattern matching, or trending algorithm may be used in order to declare the material transition point.

If the threshold has not been exceeded or the material transition point has otherwise not been declared, then the method returns to the heating step (605) in order to apply another period of induction heating to the cartridge, followed by the parameter measuring steps (610, 615). This heating and measuring loop is repeated until the threshold is exceeded or a time-out occurs (at step 620), indicating that the material transition point has been reached. The method determines the amount of energy transfer/heating for example melt-time required to reach this material transition point (step 625).

Whilst the material transition point was expressed as a signal upon which action could be taken in previous embodiments, in this embodiment the material transition point is related to an amount of heating for example a melt-time at a fixed energy transfer setting of the induction heating apparatus. The melt-time corresponds to the number of 0.1 second heating intervals needed to reach the material transition point or melt-point. For example, in the graphs of FIG. 7A-C this is approximately 56 intervals or 5.6 seconds.

Because annealing is related to the melt-point of a material, the heating required for proper annealing of a cartridge neck will be related to the heating required for melting the same type of cartridge neck. However, because of the many other variables involved, this relationship is not straightforward but can be determined experimentally to a useable accuracy. The other variables include differences in dimensions which may affect magnetic coupling of the cartridges, the mass of the material in the neck which affects the heating required, and the composition of the material which can affect both of these parameters. For example, brass cartridges may have differing ratios of copper and zinc, and possibly other materials. Because cartridges from different manufacturers and/or different product ranges have differences in these variables, the melt-point for one cartridge type cannot reliably be used to determine the heating time for annealing another cartridge type. More generally an annealing parameter such as heating time (anneal time) or heat transfer amount for a particular type of cartridge should be determined from the material transition point or melt-time of the same type of cartridge.

Suitable annealing parameters have been determined experimentally for different types of cartridges having different variables such as dimensions and mass. From these results it has been determined that a ratio of anneal-time to melt-time can be derived, and which is dependent on the melt-time of a sacrificial cartridge. Thus, the method may be implemented using a lookup table or formula to determine a ratio of anneal-time to melt-time of a sacrificial cartridge depending on the determined melt-time, and thus calculate an anneal-time for cartridges of the same type (step 635).

The method can be used to determine an annealing parameter for use in reconditioning cartridges of the same type. Typically, a shooter will have a large number of empty cartridges of a given type that can be reconditioned for reuse in order to avoid the cost of buying new cartridges or for the pleasure of such a hobby. A user of the method may apply the determined anneal-time to other cartridges of the same type (step 640). Application of the determined annealing parameter may be performed automatically by an induction annealing device.

However even within a sample of a particular cartridge type there will be some variation in these variables due to manufacturing tolerances, and so the method can be further improved by selecting a "most average" sacrificial cartridge from a sample of cartridges of the same type (step 630). The "most average" cartridge may be the one having one or more variables closest to the average of the sample. This may be determined by a user of the method using tools such as a micrometer and weighing apparatus. The above described apparatus may also be employed to measure the parameter indicative of changes in the magnetic circuit—a so called "cold test". As previously described the parameter may be indicative of the resonant frequency of an electromagnetic circuit including the "cold" cartridge, or alternatively a parameter related to inductance of the coil.

Once a sacrificial "average" cartridge is selected, the method 600 is as previously described (steps 605-640). Once an energy transfer or melt-time has been established (step 625), the method determines an annealing parameter (step 635) which may be used for other cartridges of the same type. The annealing parameter may be determined from the material transition point using a lookup table or equation derived experimentally. Annealing of the other cartridges of the same type may then be carried out using the determined annealing parameter (step 640).

A relationship has been established using testing on a number of types of cartridge in which an annealing parameter such as a heating duration has been correlated with a particular "anneal" hardness value of the cartridge neck, for example using the Vickers hardness score. In other words, the anneal time or parameter can be determined as the heating duration required to heat the cartridge neck from cold (eg room temperature) to a predetermined anneal hardness value. By determining a melt-time of the same cartridge type from cold (the same temperature such as room temperature) to material transition point, a ratio of anneal-time to melt-time can be derived. This ratio can then be applied to different melt-times, which may be associated with different cartridge types or different environmental temperatures, in order to determine a corresponding anneal-time.

In order to accommodate manufacturing variations in other cartridges of the same type, typical anneal times to achieve upper and lower bounds of hardness (eg plus or minus 10%) above and below the anneal hardness value are determined. From this information a graph of melt-time to the ratio of melt-time to anneal time at the upper and lower hardness bounds can be plotted. From this a function or equation may be derived which can be used to provide the ratio of anneal-time to melt-time for any practical cartridge of any type. Any suitable means of deriving a function from experimental data may be used, for example least squares averaging or other averaging techniques or polynomial functions.

Whilst anneal-times and melt-times have been used, other heating related measurements could be used for the annealing parameter and material transition point. For example, the energy transferred to the object could be expressed in Joules where the rate of energy transfer changes so that it is not simply related to the heating duration.

Whilst the embodiments for determining an annealing parameter have been described with respect to annealing of brass cartridges, these methods and apparatus could equally be applied to other objects such as metal parts which require reconditioning to enable reuse or to extend the life of a device using them, or to solve an issue related to hardness or brittleness. For example, electrical connectors, some of which need to be hard at one end and annealed at the other.

Unless the context clearly requires otherwise, throughout the description and claims, the words "comprise", "comprising", and the like, are to be construed in an inclusive sense as opposed to an exclusive or exhaustive sense, that is to say, in the sense of "including" but not limited to.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the scope of the defined or claimed subject matter and without diminishing its attendant advantages. It is therefore intended that such changes and modifications be included within the present disclosure.

The invention claimed is:

1. An apparatus for annealing a first object, the apparatus comprising:
  an electric circuit comprising a coil and a capacitor;
  a driver for delivering voltage to the electric circuit;
  a sensor for repeatedly measuring an inductance parameter indicative of an inductance of the electric circuit, wherein the inductance parameter is selected from the group consisting of: an inductance of the coil; a resonant frequency of the electric circuit and a duration of a predetermined number of electrical cycles of a current in the electric circuit; and
  a processor configured to:
    activate the driver when the coil is magnetically coupled to a second object, wherein the second object responds to annealing in substantially the same way as the first object;
    monitor repeated measurements of the inductance parameter by the sensor;
    determine a melting point of the second object from a predetermined change in the measurements of the inductance parameter;
    determine one or more annealing parameters for annealing the first object based on the determined melting point of the second object, wherein, when the driver is activated in accordance with the determined one or more annealing parameters when the coil is magnetically coupled to the first object to inductively heat the first object, a temperature of the first object is maintained below the melting point of the second object, and wherein the one or more annealing parameters are selected from the group consisting of: annealing time; power rating; and heat transfer amount; and activate the driver in accordance with the determined one or more annealing parameters when the coil is magnetically coupled to the first object to inductively heat the first object.

2. The apparatus of claim 1, wherein the apparatus further comprises a magnetically permeable core having a first end and a second end separated by an air gap, wherein the coil is wound around the magnetically permeable core, and wherein the air gap is configured such that the first object and the second object are able to be interchangeably located in the air gap in use.

3. The apparatus of claim 1, wherein the predetermined change in the measurements of the inductance parameter occurs when a change in one of the measurements of the inductance parameter compared to the previous measurement of the inductance parameter exceeds a threshold.

4. The apparatus of claim 1, wherein the processor is configured to determine the annealing time as a predetermined ratio of a melt time for the second object to reach the melting point when the driver is activated when the coil is magnetically coupled to the second object.

5. A processor-implemented method for determining an annealing parameter for annealing a first object, the processor-implemented method comprising:

activating a driver to deliver voltage to an electric circuit comprising a coil and a capacitor when a second object is magnetically coupled to the coil, wherein the second object responds to annealing in substantially the same way as the first object;

monitoring repeated measurements of an inductance parameter indicative of an inductance of the electric circuit from a sensor;

determining a melting point of the second object from a predetermined change in the measurements of the inductance parameter;

determining one or more annealing parameters for annealing the first object based on the determined melting point of the second object, wherein, when the driver is activated in accordance with the determined one or more annealing parameters when the coil is magnetically coupled to the first object to inductively heat the first object, a temperature of the first object is maintained below the melting point of the second object, and wherein the one or more annealing parameters are selected from the group consisting of: annealing time; power rating; and heat transfer amount; and activating the driver in accordance with the determined one or more annealing parameters when the coil is magnetically coupled to the first object to inductively heat the first object.

6. The processor-implemented method of claim 5, wherein the predetermined change in the measurements of the inductance parameter occurs when a change in one of the measurements of the inductance parameter compared to the previous measurement of the inductance parameter exceeds a threshold.

7. The processor-implemented method of claim 5, wherein the processor is configured to determine the annealing time as a predetermined ratio of a melt time for the second object to reach the melting point when the driver is activated when the coil is magnetically coupled to the second object.

8. An apparatus for detecting when a temperature of an object reaches melting point, the apparatus comprising:

an electric circuit comprising a coil and a capacitor, wherein the coil is configured to be able to magnetically couple to the object;

a driver for delivering voltage to the electric circuit;

a sensor for repeatedly measuring an inductance parameter indicative of an inductance of the electric circuit, wherein the inductance parameter is selected from the group consisting of: an inductance of the coil; a resonant frequency of the electric circuit and a duration of a predetermined number of electrical cycles of a current in the electric circuit; and a processor configured to:
monitor repeated measurements of the inductance parameter by the sensor;
determine that the temperature of the object reaches melting point when there is a predetermined change in the measurements of the inductance parameter; and
control the driver to reduce the voltage delivered to the electric circuit if the temperature of the object is determined as reaching melting point.

9. The apparatus of claim 8, wherein the apparatus further comprises a magnetically permeable core having a first end and a second end separated by an air gap, wherein the coil is wound around the magnetically permeable core, and wherein the object is located in the air gap in use.

10. The apparatus of claim 8, wherein the predetermined change in the measurements of the inductance parameter occurs when a change in one of the measurements of the inductance parameter compared to the previous measurement of the inductance parameter exceeds a threshold.

* * * * *